Figure 2:
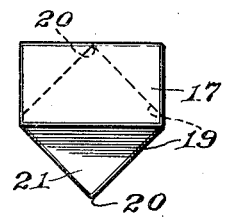

April 12, 1949. D. M. THORPE 2,467,166
CHECKER BRICK AND CHECKER WORK
Filed March 15, 1945 4 Sheets-Sheet 1

Drew M. Thorpe,
INVENTOR.

BY J. Stuart Freeman,
Attorney.

April 12, 1949.　　　　　　D. M. THORPE　　　　　　2,467,166
CHECKER BRICK AND CHECKER WORK
Filed March 15, 1945　　　　　　　　　　　　　　4 Sheets-Sheet 2

Drew M. Thorpe
INVENTOR,
BY Stuart Freeman
Attorney.

April 12, 1949.  D. M. THORPE  2,467,166
CHECKER BRICK AND CHECKER WORK
Filed March 15, 1945  4 Sheets-Sheet 3

Drew M. Thorpe, INVENTOR,
BY J. Stuart Freeman,
Attorney.

April 12, 1949.  D. M. THORPE  2,467,166
CHECKER BRICK AND CHECKER WORK
Filed March 15, 1945  4 Sheets-Sheet 4

INVENTOR,
Drew M. Thorpe,
BY J. Stuart Freeman
Attorney.

Patented Apr. 12, 1949

2,467,166

UNITED STATES PATENT OFFICE 2,467,166

CHECKER-BRICK AND CHECKERWORK

Drew M. Thorpe, Villanova, Pa., assignor to General Refractories Company, Philadelphia, Pa., a corporation of Pennsylvania Application March 15, 1945, Serial No. 582,945

5 Claims. (Cl. 263—51)

This invention relates to improvements in checker brick per se, and to the checkerwork or systems in which they are used in the regenerators employed in furnaces used in the production of iron, steel, copper, zinc and other metals, and in the manufacture of glass, enamels and such products, said furnaces including crucible, glass tank, melting, open hearth, pot, reducing, reverberatory and similar furnaces, hot blast stoves and the like.

In checkerwork constructions of this kind, a primary aim is to provide a vertically and transversely channeled stable mass of the minimum number of different, relatively inexpensive, standard and/or special shapes, of such individual design as to permit such a relation between a free yet baffled flow of gas and air on the one hand, and the bulk or cubical content of refractories on the other, that the highest possible efficiency will be effected in heat transfer, first in absorbing heat from spent gases of combustion flowing therethrough in one direction, and in subsequently relinquishing or imparting that heat to fresh air and/or gases passing therethrough in the opposite direction.

A more specific object is to provide a checkerwork that is characterized by a plurality of cross or transverse partitions, which with the surrounding walls of the checker chamber provide a series of vertical flues, and a plurality of apertures or posts extending through each of said partitions in staggered arrangement, to insure equalization of the pressure of the gases in the several flues, and at the same time permit a diagonal trend in the flow of air and gases through the chamber from upper forward to lower rear portions thereof and vice versa while simultaneously precluding the formation of inactive or "dead" spaces, such as result from restrictions or limitations imposed by many checker systems upon the travel of gas and air in passing in one or both directions through the chamber.

Another object is to provide a unique design of checker brick per se, both ends of which are preferably rectangular in shape vertically and are positioned in aligned apertures in adjacent partitions, such shapes providing the necessary supporting brick-spacing and contact-surfaces between checkers and partitions, while the middle or intermediate portion, that is, the section between adjacent partition surfaces also has a vertical substantially rectangular cross section angularly rotated approximately 45°, so as to provide enhanced automatic scavenging or shedding of dust carried over by the air and gases, and at the same time minimizing the resistance that the checker unavoidably offers to the flow of air and gas past them.

A further object is to provide a construction of checker brick and the system in which it is preferably used, that will insure a maximum of turbulence while offering a minimum of resistance to the passage of air and gases in either direction therethrough, this being accomplished by arranging a series of transverse flue-defining partitions at right angles to the inward flow of the air and gases, numerous apertures provided in and extending through said partitions, and a staggered arrangement of both the apertures and the checkers themselves.

The transverse partitions, which are about 85% solid, comprise the baffle medium that forces the air and gases to flow primarily vertically through the checkerwork, and thereby providing with the transversely arranged checkers the maximum path of travel, it being recognized that the longer the travel, within proper limits, the greater the heat transfer, both during the exit of waste gases of combustion and the ingress of air during the air-heating cycle.

Still another object is to provide a construction that offers a minimum of horizontal surfaces for the accumulation of dust and/or slag, while providing a medium for positively spacing the partitions with respect to each other in a practically rigid, stable construction or assembly, the collection of dust deposits proportionately retarding the flow of air and gas, and thereby defeating the heat-transfer function of the chamber as its efficiency is gradually diminished.

A still further object is to provide a composite design that is sufficiently flexible to permit variations in flue dimensions, depending upon the number and size of the checker brick used, while at the same time retaining all of the advantages and the high efficiency of the system as herein set forth.

And still further objects are to provide a checker brick that is adapted for manufacture by any of the hand-made, dry-pressed and steam-pressed methods; that can be made of common fire clay, super-duty, high alumina, sillimanite, silica, chrome, magnesite and similar clays; that offers a substantially horizontal surface upon which a compressed air or other cleanout tool can rest while being manipulated in three dimensions; and that when used with regular or but slightly modified standard brick can be laid up originally or replaced by relatively unskilled labor.

Figure 1:
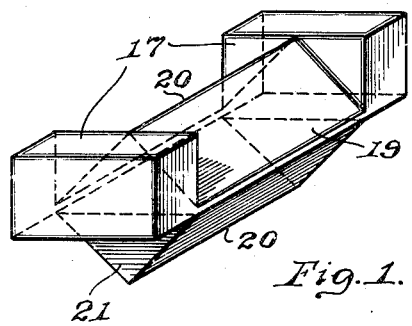
Figure 3:
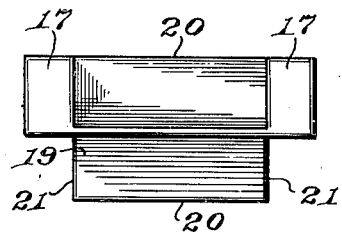
Figure 4:
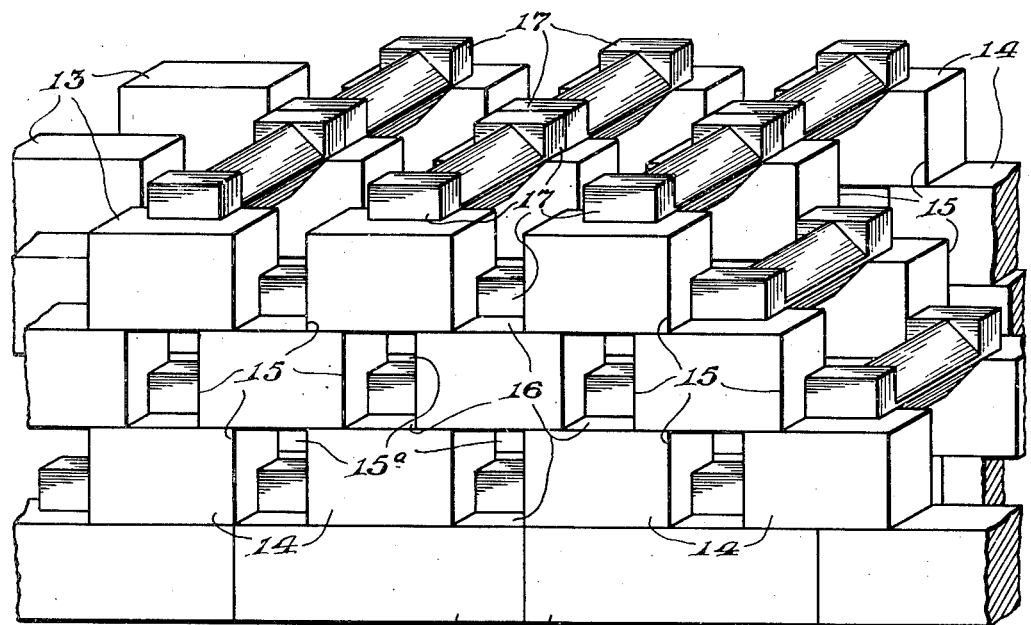
Figure 7:
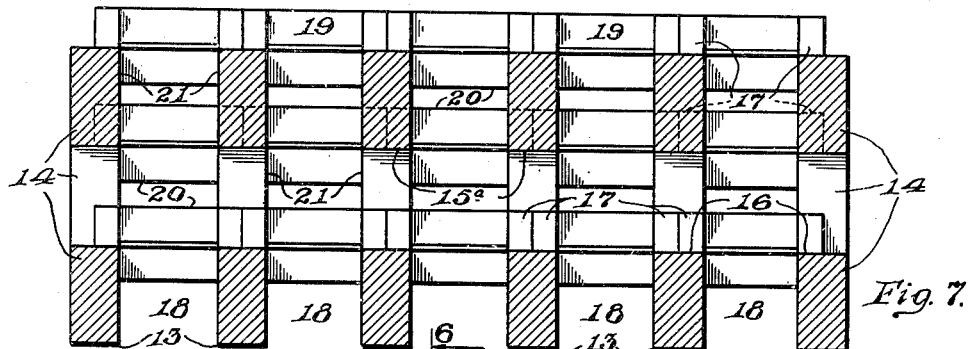
Figure 5:
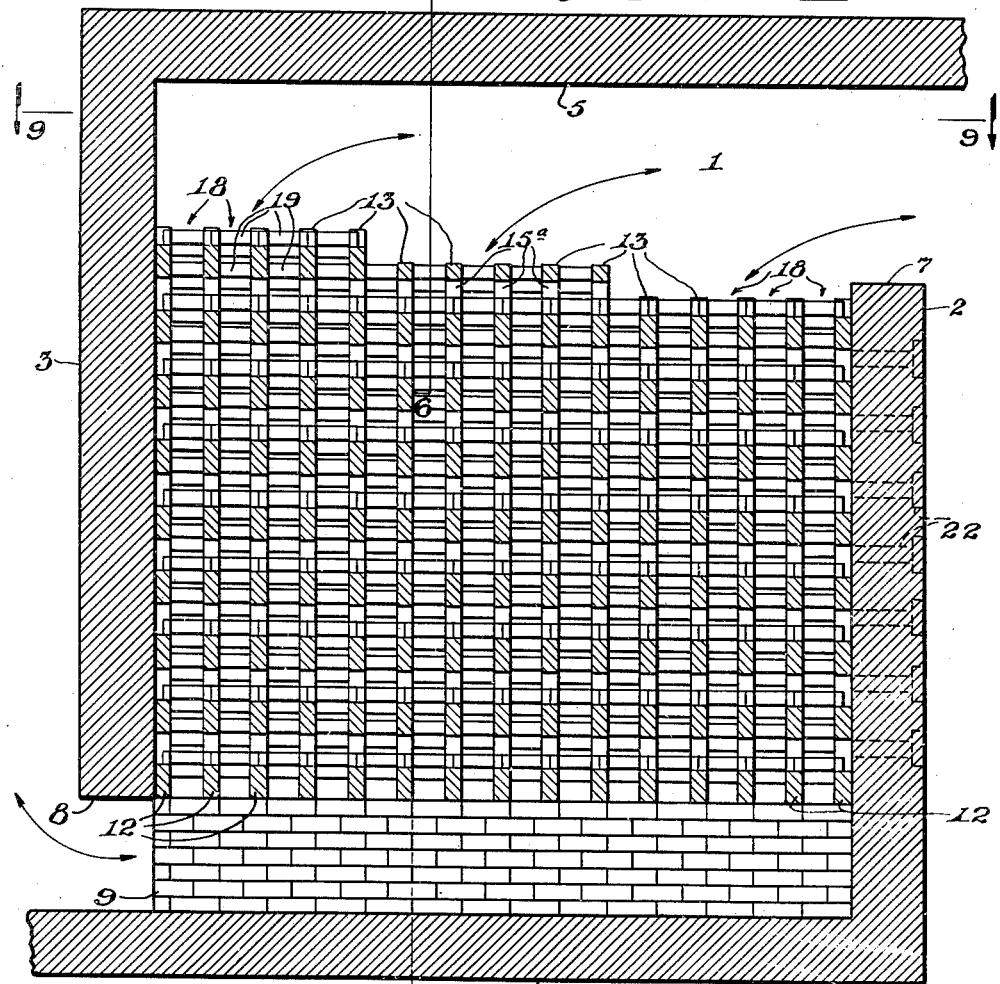
Figure 8:
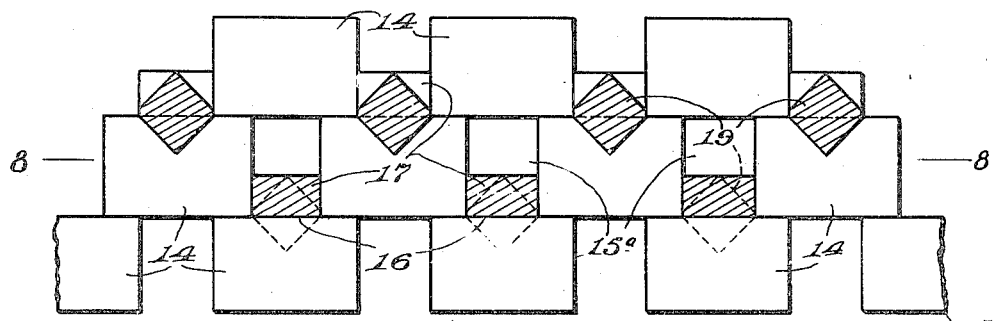
Figure 6:
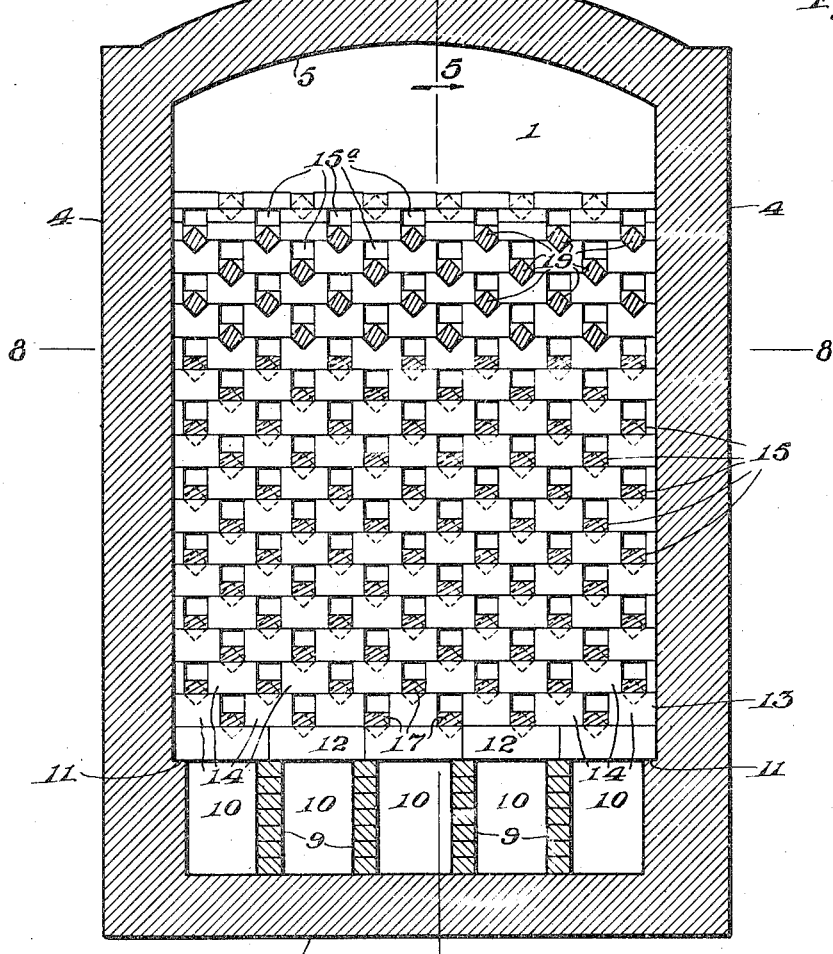
Figure 9:
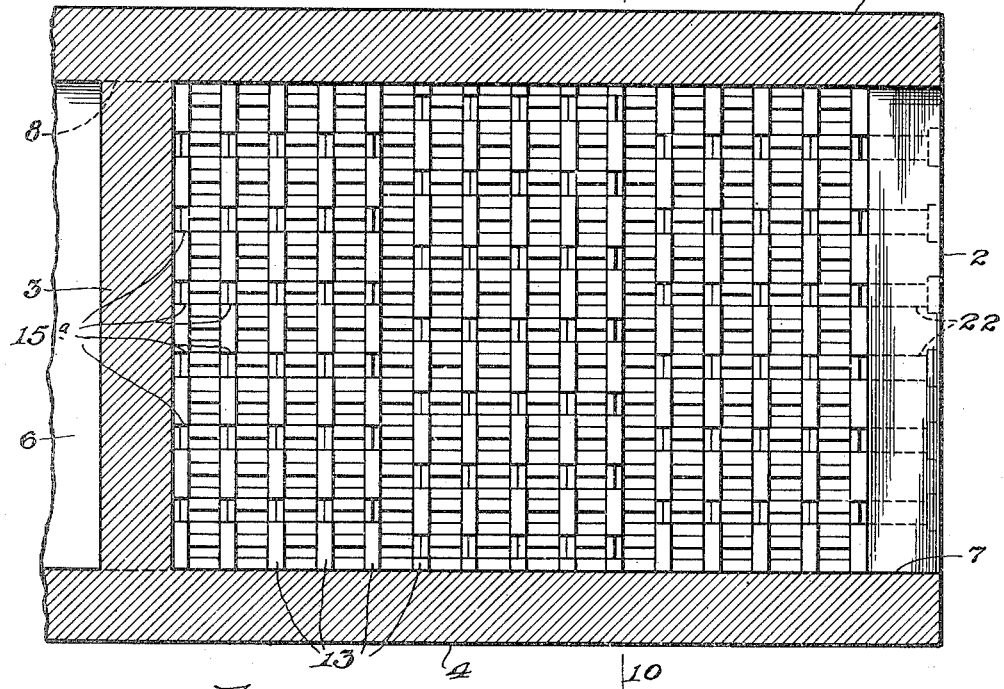

With the objects thus briefly set forth, the invention comprises further details of construction and operation, which are hereinafter set forth in the following description, when read in conjunction with the accompanying drawings in which Fig. 1 is a perspective view of a checker brick comprising one embodiment of the invention; Figs. 2 and 3 are end and side elevational views, respectively, of the same; Fig. 4 is a perspective view of a fragmentary portion of the improved assembled checker brick system; Fig. 5 is a vertical longitudinal section through a checker chamber in a regenerative type furnace, taken on the line 5—5 of Fig. 6; Fig. 6 is a vertical transverse section on the line 6—6—6 of Fig. 5; Fig. 7 shows an enlarged fragmentary portion of the system as seen in Fig. 5; Fig. 8 shows an enlarged fragmentary portion of the system as seen in Fig. 6, partly above and partly below the line 8—8 of Fig. 6; Fig. 9 is a horizontal section on the line 9—9 of Fig. 5; and Fig. 10 shows an enlarged fragmentary portion of the system as seen in Fig. 9, partly to the left and partly to the right of the line 10—10 of Fig. 9.

Referring to the drawings, a checker chamber 1 is shown as being substantially enclosed by and within front and rear walls 2 and 3, side walls 4, an arched roof 5 and a bottom 6. The front wall terminates upwardly short of the roof to provide an upper opening 7, while the rear wall terminates downwardly short of the bottom to provide a second opening 8. During the first cycle of operation hot gases of combustion, or from other sources, pass inwardly through the upper opening 7 and outwardly through the lower opening 8, following which relatively colder air (or gas) passes in the reverse direction, that is, inwardly through the lower opening 8 and outwardly through the upper opening 7.

Within said chamber and resting upon the bottom thereof are a series of transversely spaced, longitudinally extending foundation walls 9, between which the lowermost portions of the side walls 4 are defined flues 10, which are closed at their forward ends but open rearwardly into the lower chamber opening 8. The upper surfaces of said piers terminate in a plane that is common both to themselves and to shoulders 11 in the side walls 4, so as to form a direct support for longitudinally spaced, transversely extending rider tile 12, that stand on edge and form supports for the vertical, flue-defining partitions 13 forming an integral and essential part of the checker construction or system.

Figure 10:
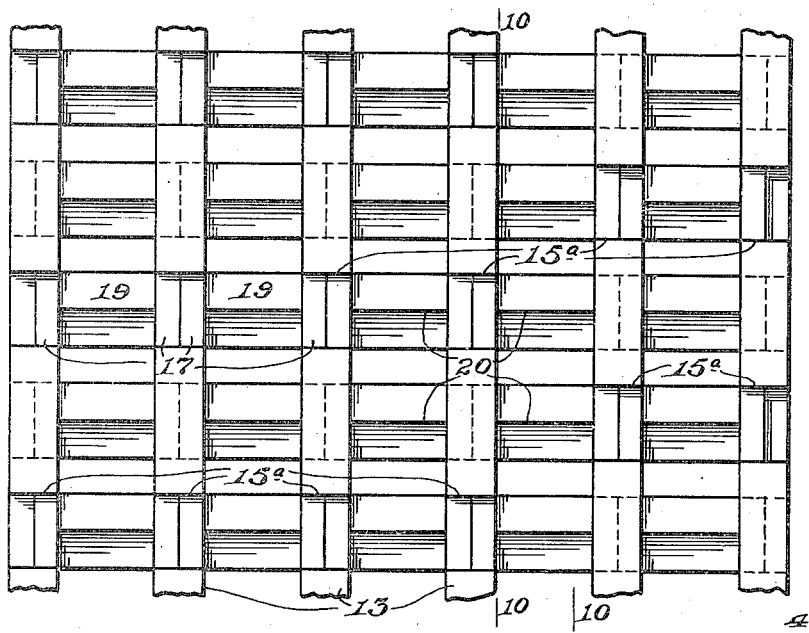

Each of the said partitions is preferably composed of standard brick 14, the lowermost course of which rests upon the rider tile 12 and are spaced apart as shown in Figs. 4, 6, 8, 9 and 10. Additional courses of the same standard brick are laid thereon in such manner as to be staggered as to one another, and at the same time provide vertically staggered spaces 15, that occur in aligned pairs in adjacent partitions as best shown in Figs. 4, 9 and 10, each space having a lower supporting surface 16, which is flat when using standard brick but may instead be of any suitable shape and inclination.

Upon these supporting surfaces 16 rest the preferably rectangular end portions 17 of the improved design of checkerbrick shown per se in Figs. 1, 2 and 3. Essentially, the under surfaces of the checker ends 17 should conform to the supporting surfaces 16, but the entire upper portions of said ends 17, or any part thereof, may be of any desired shape as, for instance, rounded, slanting or tapering, in order to better shed dust that tends to collect upon substantially flat surfaces in any such construction. In any case, that portion of the spaces 15 above the ends of said checkers is permitted to remain open and maintain free of obstruction, to provide transverse pressure-equalizing apertures 15a between adjacent vertical flues 18 defined by and between the partitions 13 and the side walls 4 of the chamber. Furthermore, the combination of vertical flues and transverse partition apertures permits a generally diagonal tend of air and/or gases in both directions between the chamber openings 7 and 8.

Each of said checker brick, between its ends 17, comprises a polygonal intermediate section 19, preferably of substantially square cross-section and angularly positioned, so that two of its opposite edges 20 extend upwardly and downwardly, thereby providing resistance-minimizing, wedge shapes that insure uniform gas velocity and offer but little resistance to the passage of air and gases either upwardly or downwardly through said flues. The length of said intermediate section is substantially that of the distance between the end portions 17, so that the ends of the lower half of said intermediate portion form shoulders 21, that abut against and operate to positively space said partitions apart. For cleaning the upper surfaces of said checker brick, that is, the upper surfaces of the end portions 17 and the central portions 19, pneumatic hose and extension nozzles (not shown) may be inserted at spaced intervals into the chamber through cleanout openings 22 in the front wall 2, that are normally closed.

Referring to Figs. 1 and 6, it should be noted that in some installations it has been found desirable to omit alternate horizontal courses of the checker brick, which thereby results in more direct passage of gases vertically and less deposit of dust upon the checkers. This modification may be attended by leaving the vacated transverse passages 15a open, or by closing them if preferred with small brick, or by rearrangement of the brick in the partitions at the levels of the vacated courses. Furthermore, upon eliminating vertically alternate courses of the checkers, those remaining may be rearranged in vertically staggered positions instead of in vertical alignment as illustrated, in order to retain a substantial degree of turbulence with lessened obstruction.

From this detailed description it will be clearly evident the extent to which the objects hereinbefore set forth have been achieved.

Having thus described my invention, what I claim and desire to protect by Letters Patent of the United States is:

1. A checker brick system, comprising a plurality of vertical partitions defining flues between them and composed of a plurality of courses of brick, pairs of bricks in each course being spaced apart to provide pressure-equalizing apertures, a plurality of transversely extending checker bricks, each of which comprises horizontally positioned oblong end portions of less vertical cross section than said apertures and resting upon the bottoms of a pair of aligned apertures, and a substantially square intermediate portion comprising upwardly and downwardly directed sloping surfaces, said upwardly sloping surfaces converging to an angle lying in the common plane of the upper surfaces of said end portions, and said downwardly sloping surfaces extending substantially entirely below the level of said apertures and providing with shoulders abutting against said partitions and said end portions being equal in height to approximately one-half the height of said intermediate portion.

2. A checker brick system, comprising a plurality of vertical partitions defining flues between them and composed of a plurality of courses of brick, pairs of bricks in each course being spaced apart to provide pressure-equalizing apertures, and the bricks of said courses being staggered to provide a staggered arrangement of apertures, and a plurality of vertically staggered transversely extending checker bricks, each of which comprises horizontally positioned oblong end portions of less vertical cross section than said apertures and resting upon the bottoms of a pair of aligned apertures in adjacent partitions, and a substantially square intermediate portion of substantially rectangular cross section providing upwardly and downwardly directed pairs of slanting surfaces, said intermediate portions extending below the level of said apertures and provided with shoulders abutting against said partitions and said end portions being equal in height to approximately one-half the height of said intermediate portion.

3. In a checkerwork for regenerators, the combination of spaced upright partitions providing staggered pairs of transverse apertures, with checker bricks comprising end portions of less cross sectional area than said apertures and resting upon the bottoms of the apertures of each pair, and intermediate portions of said checker bricks of substantially rectangular cross section, and having a longitudinally extending angular edge portion projecting below the level of said apertures to provide shoulders abutting against said partitions.

4. A checker brick, comprising oblong end portions whose greater dimension is horizontal, and a substantially square connecting portion, the plane of two of its diagonally opposite edges substantially coinciding with the common plane of the under surfaces of said end portions, and whose diagonal dimension substantially equals the horizontal width of said end partitions, and the uppermost edge of said connecting portion lying substantially in the common plane of the upper surfaces of said end portions.

5. A checker brick, comprising horizontally positioned oblong end portions, and a substantially square connecting portion whose sides are substantially forty-five degrees with the horizontal, the horizontal width of said connecting portion being substantially equal to the greater horizontal width of said end portions, the uppermost edge of said connecting portion lying in the common plane of the upper surfaces of said end portions, and substantially one-half of the transverse area of said connecting portion being below the common plane of the under surfaces of said end portions.

DREW M. THORPE.

REFERENCES CITED

The following references are of record in the file of this patent:

UNITED STATES PATENTS

| Number | Name | Date |
|---|---|---|
| 301,048 | Cuthbert | June 24, 1884 |
| 1,856,473 | Drain | May 3, 1932 |
| 1,907,852 | Miller | May 9, 1933 |
| 1,980,827 | Reed | Nov. 13, 1934 |